May 17, 1932.  C. BURKHARDT  1,858,816
CONDUCTOR CORD ATTACHMENT
Filed Sept. 26, 1929
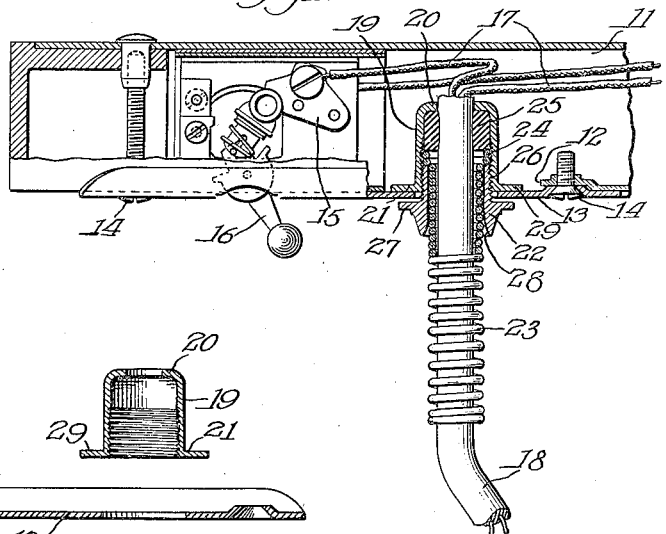
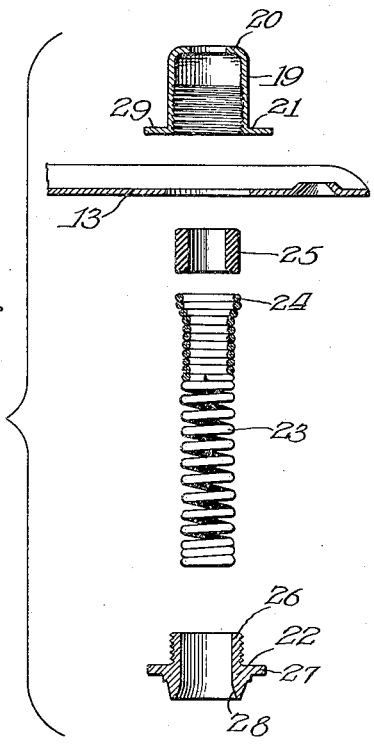
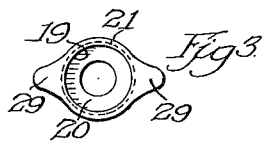
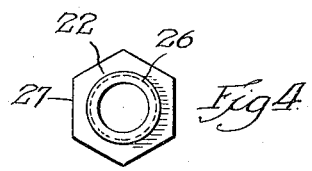
Inventor:
Chandos Burkhardt
By Harry S. Demarest
Atty
Witness
R B Davison Patented May 17, 1932

1,858,816

UNITED STATES PATENT OFFICE

CHANDOS BURKHARDT, OF CANTON, OHIO, ASSIGNOR TO THE HOOVER COMPANY, A CORPORATION OF OHIO

CONDUCTOR CORD ATTACHMENT

Application filed September 26, 1929. Serial No. 395,447.

This invention has to do with attachments for electrical connections, and particularly to structures for attaching to a tool handle or other member having a wall, the cord or cable containing the wires by which an electrical connection is established. It is the usual practice to incorporate wires in a round, flexible cable of soft rubber and, at that end of the cable adjacent to the attachment fixtures, to provide a cord strain relief member, in the form of a relatively stiff helical spring surrounding the cord and offering sufficient resistance to bending to prevent bends of the cord which would be sharp enough to break the wires therein.

One of the objects of this invention is to provide a suitable structure for anchoring the end of the cable and the cord strain relief member.

A further object of the invention is to provide such a structure which will permit the cord and its strain relief member to be readily attached to or detached from the tool or other walled member.

A still further object is to provide such a structure which can be economically manufactured, which will be efficient and durable in use, which will be light in weight, and which will be substantially flush with the wall to which the cord is attached, so as to present no unsightly or encumbering projection.

A still further object of the invention and various novel features will be apparent from the following specification, when considered in view of the disclosure of the accompanying drawings, in which:

Fig. 1 is a central, vertical, longitudinal section of a tubular handle, showing an embodiment of the invention.

Fig. 2 is an exploded view showing, in vertical section, certain of the parts shown in Fig. 1; and Figs. 3 and 4 are plan views showing certain of the parts in detail.

The invention is herein disclosed as embodied in a structure attached to a tubular handle, such as might be used in a suction cleaner, soldering iron, or other portable tool, but it will be understood that the invention is equally applicable for the attachment of a cord to the cover plate of an outlet box, or wherever it is desired to attach a cord to a flat or substantially flat wall.

As shown in Fig. 1 the handle or base 11 is tubular and provided with a lateral opening 12 closed by a cover plate 13, which is secured in place by screws 14. In order to facilitate the assembling of a switch of the tumbler type indicated generally by the numeral 15, and having an operating lever 16, such switch is mounted upon the cover plate as shown, the details of construction and mounting of such switch constituting no part of the invention.

One of the wires 17, of the flexible cord 18, is connected to the switch 15, and the other is connected to a motor or other device, an additional lead thereto being provided, as usual, from the other side of the switch. A cup shaped socket member 19 is provided within the tubular member 11, and has an inwardly projecting annular flange 20 at its inner end, and an outwardly extending flange 21 for engagement with the wall of the cover plate 13. The socket member 19 is threaded internally adjacent its open end to receive the tubular securing nut 22, by which the cord strain relief member 23 is anchored in place. The member 23 is formed of relatively stiff wire, wound into a helix of such diameter as to receive loosely the cord 18, the successive turns adjacent its fixed end being substantially in contact, and the last two turns being of slightly increased diameter as shown in the drawings, to constitute in effect an anchoring flange 24. A bushing 25 of soft rubber, or similar material, is provided to surround closely the cord 18 and fit within the socket member 19, such bushing being preferably split at one point to facilitate assembly. The securing member or nut 22 has a tubular externally threaded end portion 26 which engages the widened end turns 24 of the cord strain relief member 23, as it is screwed into the socket member 19, and compresses the rubber bushing 25 between the end of the cord strain relief member 23 and the flange 20. The engagement of the parts therefore not only anchors the cord strain relief member to the plate 13, but also, by distorting the rubber bushing 25 into binding engagement with the surface of the cord 18, frictionally grips the cord so as to secure it in place.

The securing member 22 is preferably provided with a hexagonal portion 27 to adapt it for manipulation by a wrench, and the opening through the member is rounded as shown at 28 so that the helical spring member 23 and the enclosed cord 18 will be reinforced thereby but will be prevented from bending over too sharp an edge. It will be apparent that when the socket member 19 and the nut 22 are in threaded engagement as shown they are secured to the plate 13, which is engaged between flanges on such members, but it is usually preferable to secure the socket member 19 to the underside of the plate 13, and tabs 29 may be provided on the flange 21 to facilitate securing of the socket member 19 by spot welding or in some other suitable manner.

The securing member 22 presents no cumbersome projection above the surface of the cover plate 13, appearing much like a fillet about the base of the spring member 23, and the parts, including the switch and the cover plate, may be readily assembled with the cord to form a unit which may be readily and quickly connected to the handle or tool 11. The spring member 23 and the cord 18 will be efficiently anchored but may be readily released if desired, and the structure is not only efficient but includes few parts and can be economically manufactured.

I claim:

1. In combination with a base member and a flexible conductor cord, of means for anchoring the cord to the base member comprising a socket member within said base member and having an abutment therein, a flexible tubular reinforcing member having a terminal flange received within said socket member, a bushing between said flange and said abutment, and means cooperating with said socket member and engaging said flange to compress said bushing into frictional engagement with the cord.

2. In combination with a base member and a flexible conductor cord, of means for anchoring the cord to the base member, comprising a socket member within the base member and having an abutment therein, a helical spring reinforcing member surrounding the cord and having a terminal turn enlarged and received within said socket member, distortable means about the cord between said enlarged turn and said abutment, and a member surrounding said reinforcing member and in threaded engagement with said socket member for compressing said distortable means into frictional engagement with the cord.

3. In combination with a base member and a flexible conductor cord, of means for anchoring the cord to the base member comprising a socket member within the base member and having an abutment therein, a helical spring reinforcing member surrounding the cord and having an enlarged portion, gripping means about the cord within said socket member, and a tubular securing member in threaded engagement with said socket member, said securing member engaging the enlarged portion of said reinforcing member to prevent endwise movement thereof and cooperating with said socket member to force said gripping means into engagement with the cord.

4. In combination with a casing having a wall and a flexible conductor cord, of means for anchoring the cord to the wall comprising a socket member within the casing and having a base flange, a flexible tubular reinforcing member surrounding the cord and having a terminal flange, a tubular securing member extending through the wall into threaded engagement with said socket member with its end engaging said flange, and means about the cord adapted to be compressed between said terminal flange of said reinforcing member and said base flange into gripping engagement with the cord, said socket member and said securing member having flanges on opposite sides of the wall extending laterally from the edge of the opening therethrough.

5. In combination with a casing having a wall and a flexible conductor cord, of means for anchoring the cord to the wall comprising a socket member secured to the inner side of the wall and having an inwardly extending flange at its inner end, a tubular reinforcing member surrounding the cord and having a terminal flange, gripping means about the cord within said socket member, and a tubular securing member engaging the flange on said reinforcing member and in threaded engagement with said socket member for forcing said gripping means into engagement with the cord.

Signed at North Canton, in the county of Stark and State of Ohio, this 16th day of September, A. D., 1929.

CHANDOS BURKHARDT.